Figure 1:
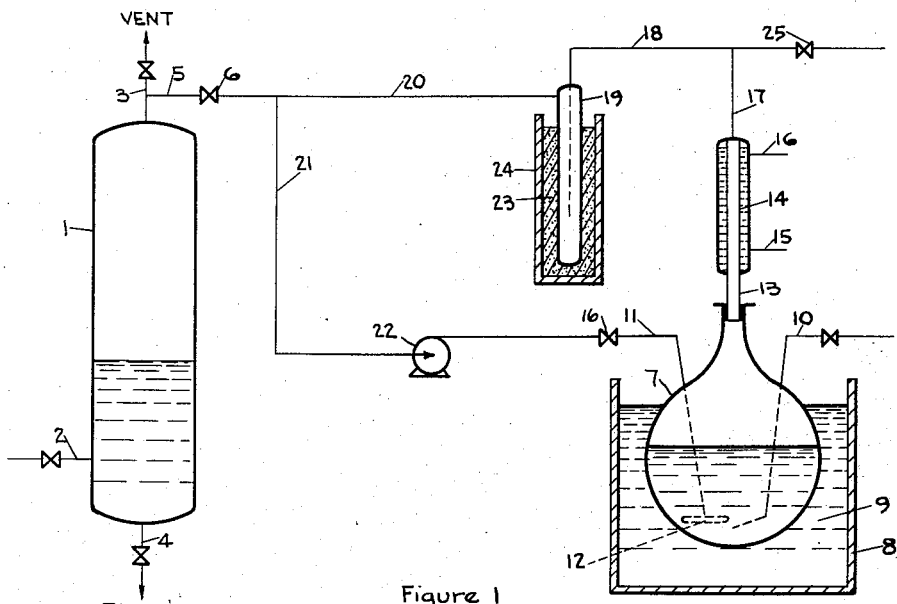

Jan. 27, 1959  F. F. RUST  2,871,104
MANUFACTURE OF HYDROGEN PEROXIDE
Filed Jan. 31, 1955

Inventor: Frederick F. Rust
By Alan C. Batchelder
His Agent

United States Patent Office 2,871,104
Patented Jan. 27, 1959

2,871,104

MANUFACTURE OF HYDROGEN PEROXIDE

Frederick F. Rust, Orinda, Calif., assignor to Shell Development Company, New York, N. Y., a corporation of Delaware Application January 31, 1955, Serial No. 484,864

29 Claims. (Cl. 23—207)

This invention relates to a new and improved process for the production of hydrogen peroxide.

More particularly, the invention relates to a novel method for the production of hydrogen peroxide, wherein secondary alcohols are oxidized in liquid phase to produce directly hydrogen peroxide. Specifically, the invention relates to a method for oxidizing secondary alcohols in liquid phase and so directing the oxidation that, instead of water, hydrogen peroxide is produced as the predominant inorganic product of the oxidation.

This application is a continuation-in-part of copending application Serial No. 130,852, filed December 2, 1949, now abandoned.

There have been reported instances in which oxidation of certain organic compounds, in the gas phase, has produced hydrogen peroxide. Gas-phase oxidation of normally gaseous saturated aliphatic hydrocarbons, especially propane, has been shown in U. S. Patent No. 2,376,257, to produce organic peroxides together with hydrogen peroxide. More recently it has been reported in U. S. Patent No. 2,479,111 that partial oxidation of primary and secondary alcohols in gas phase under certain conditions will form hydrogen peroxide. Such high temperature gas phase oxidations suffer from the disadvantage of the difficulty of controlling the highly exothermic reactions in large scale operations. Furthermore, the amount of hydrogen peroxide produced from a given amount of reactants charged is undesirably low, as is the rate of production of hydrogen peroxide when considered with regard to the volume of the reaction space in any given piece of equipment.

The prior art is replete with descriptions of processes for the oxidation of alcohols in the liquid phase to produce organic carbonyl compounds, such as aldehydes, ketones and acids or esters. Typically, a catalyst is added to the liquid alcohol (and numerous materials, such as metals and compounds of metals, have been mentioned as being suitable catalysts) and the alcohol is oxidized by blowing air, oxygen or other oxygen-containing gas through it in the presence of the catalyst. The reaction between the alcohol and the oxygen proceeds substantially as follows:

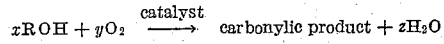

$$xROH + yO_2 \xrightarrow{\text{catalyst}} \text{carbonylic product} + zH_2O$$

ROH signifying the alcohol and $x$, $y$ and $z$ representing low integers. Obviously, water being the inorganic product of the oxidation these prior methods have no value for the production of hydrogen peroxide.

There also have been reported instances in which exposure of alcohols to the action of ultra-violet light of short-wave length, at room temperatures or below and in certain cases at temperatures up to 40° C. to 50° C., has formed mixtures which react to tests indicating the presence of peroxides. Because of the small amounts of peroxides produced, and the fact that the peroxides are in most cases stable organic peroxides, these observations likewise do not provide basis for a practical method for producing hydrogen peroxide.

A principal object of this invention is a new and improved method for the production of hydrogen peroxide.

Another object of the invention is a method for effecting the oxidation of secondary alcohols in liquid phase to produce hydrogen peroxide.

A further important object of the invention is a method for oxidizing secondary alcohols in liquid phase and so directing the reaction that, instead of water, hydrogen peroxide is produced as the predominant inorganic product of the oxidation.

A method for non-catalytic, non-photochemical oxidation of secondary alcohols, whereby the oxidation proceeds with formation of high yields of hydrogen peroxide, is another important object of the invention. A process for oxidizing secondary alcohols by maintaining the alcohol in liquid state in the presence of hydrogen peroxide while aerating the mixture with molecular oxygen-containing gas, whereby hydrogen peroxide is produced in high yields by oxidation of the alcohol, forms a further object of the invention. Still other and related objects of the invention will be apparent from the nature of the specification and claims hereinafter.

Forming a part of the present specification is the drawing wherein

Figure 2:
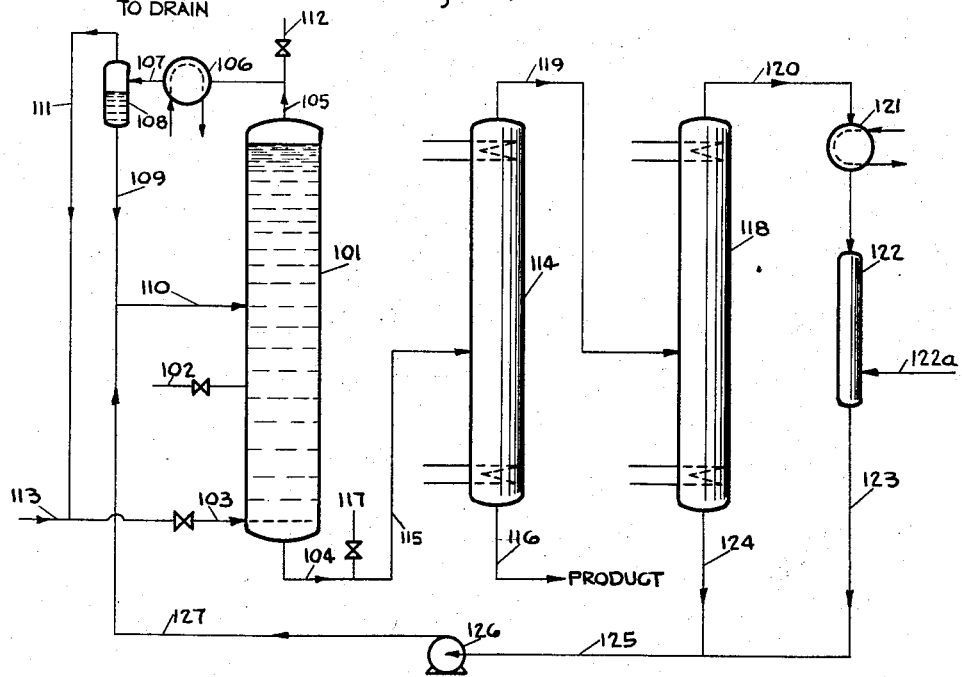

Figure 1 illustrates diagrammatically one way in which the process may be practiced batchwise, and Figure 2 illustrates diagrammatically one way in which the process may be practiced continuously.

It has been discovered in accordance with the present invention that hydrogen peroxide can be produced in high yields and conversions by maintaining a secondary alcohol in liquid phase in the presence of hydrogen peroxide at a reaction temperature upwards from about 70° C. in a reaction system in which hydrogen peroxide is relatively stable, while introducing oxygen-containing gas into the liquid body comprising the secondary alcohol and hydrogen peroxide. The hydrogen peroxide thus generated remains, collects, or accumulates in the liquid body that is undergoing oxidation. It may be recovered by withdrawing liquid oxidation product either continuously or intermittently from the reaction zone and fractionally distilling or otherwise treating the withdrawn product to recover the hydrogen peroxide from it.

Hydrogen peroxide can be produced in accordance with one embodiment of the invention by passing a stream of gas containing molecular oxygen into and through a body of liquid comprising a secondary alcohol and hydrogen peroxide maintained in an environment in which hydrogen peroxide is relatively stable at a reaction temperature upwards from about 70° C. at a total pressure not less than vapor pressure of the body of liquid at the operating temperature, continuing the flow of gas containing molecular oxygen into and through the body of liquid in the presence of peroxidic products of the oxidation accumulated, in the entirety or in part, in the body of liquid undergoing aeration at least until hydrogen peroxide is formed and accumulated in the body of liquid, and recovering hydrogen peroxide from the liquid oxidation product.

Where, as is preferred, the process of the invention is conducted in a continuous manner, the secondary alcohol is maintained in liquid phase in the presence of hydrogen peroxide at a reaction temperature upwards from about 70° C. in a reaction environment in which hydrogen peroxide is relatively stable and at a total pressure not less than the vapor pressure of the body of liquid at the operating temperature, a gas containing molecular oxygen and further amounts of the secondary alcohol are introduced into the liquid body comprising the said secondary alcohol and the said hydrogen peroxide at rates so as to hold the concentration of hydrogen peroxide in the liquid body substantially constant during at least a major portion of the contact period and the body of liquid substantially at saturation with respect to the gas containing molecular oxygen, withdrawing liquid product from the reaction zone at a rate preferably adjusted to maintain the body of liquid undergoing oxidation at substantially constant volume, and recovering hydrogen peroxide from the liquid product.

Oxidation of secondary alcohols according to the invention can yield hydrogen peroxide as the predominant inorganic reaction product. Ketone corresponding to the secondary alcohol is produced as secondary or co-product. The yield of ketone, based upon the amount of secondary alcohol consumed by the oxidation, generally approaches quantitative yields. Using isopropyl alcohol as the secondary alcohol reactant, yields of acetone greater than 98% based upon the isopropyl alcohol consumed with yields of hydrogen peroxide better than 80% based upon the amount of acetone produced, are readily obtainable. The process of the invention can be operated at high conversions of the alcohol feed with surprisingly high yields of hydrogen peroxide at such high conversion levels, resulting in a practical process for large-scale, economic manufacture of hydrogen peroxide.

The process of the present invention is applicable generally to alcohols which have one hydrogen atom directly linked to the carbon atom of the hydroxy-substituted carbinyl group, i. e., to secondary alcohols. Hydrogen peroxide can be produced by the method of the invention from secondary alcohols which contain a cyclic structure, from secondary alcohols which contain one or more carbon-to-carbon multiple bonds, and from secondary alcohols which contain one only or a plurality of secondary alcoholic hydroxyl radicals. Although the process of the invention is thus broadly applicable, optimal results have been obtained when the alcohol that is employed is a saturated secondary alcohol. Non-interfering substituents or radicals, such as ether or ester linkages or keto groups, may be present, although it is preferred to employ as the alcohol an unsubstituted saturated, preferably monohydric, secondary alcohol, such as a lower secondary alkanol.

Secondary alcohols which can be employed include isopropyl alcohol, secondary butyl alcohol, the secondary amyl alcohols, the secondary hexyl alcohols, the secondary heptyl alcohols, the secondary octyl alcohols, and even higher secondary alcohols. Cyclic secondary alcohols which can be employed in accordance with the invention include, for example, cyclohexanol, 2-methylcyclohexanol, 4-ethylcyclohexanol, 3,3,5-trimethylcyclohexanol, 3,3,5-triethyl-5-propylcyclohexanol and their various analogs and homologs. Unstaurated alcohols which may be employed in accordance with the invention include, for example, methyl vinyl carbinol, ethyl allyl carbinol, 3,3,5-trimethyl - 2 - cyclohexen-1-ol, 3-cyclohexen-1-ol, 2-cyclohexen-1-ol, 3,3-diethyl-5-propyl-2-cyclohexen - 1 - ol, cinnamyl alcohol, 1-phenylethanol, and the like, and their various analogs and homologs. Substituted secondary alcohols which contain relatively unreactive substituent groups include, for example, glycerin alpha,gamma-dimethyl ether, glycerin alpha,gamma-diisopropyl ether, the monomethyl ether of butane-2,3-diol, the monoisopropyl ether of pentane-2,4-diol, the alpha-2-methoxyethyl ether of propylene glycol, the monoacetate of hexane-2,5-diol, 1,3-epoxy-2-propanol, and the alpha, omega-dipropionate of 1,2,6-hexanetriol. Of the various secondary alcohols, the secondary saturated unsubstituted monohydric alcohols containing from 3 to 8 carbon atoms form a preferred group, those containing from 3 to 6 carbon atoms being especially preferred.

Among the various secondary alcohols that may be employed, isopropyl alcohol occupies an apparently unique position. Apparently as a result of its structure, oxidation of isopropyl alcohol according to the method of the invention has been found to form higher yields of hydrogen peroxide than the oxidation of other, even closely related, alcohols. Secondary butyl alcohol and cyclohexanol also are preferred individual secondary alcohols.

The process of the invention can be carried out utilizing only a single alcohol reactant, or a mixture of two or more secondary alcohols may be employed. When mixtures are used, unconsumed secondary alcohol and the carbonylic compounds formed by the oxidation will be present in mixtures which in general are not as amenable to separation as when but a single secondary alcohol is employed. It is preferred to conduct the process of the invention employing but a single secondary alcohol, since in this way the optimum yields of hydrogen peroxide may be realized while at the same time recovery of desired secondary products in useful form is facilitated.

In order to obtain useful yields of hydrogen peroxide by oxidation of secondary alcohols in accordance with the process of the present invention, it is necessary to conduct the oxidation of the secondary alcohol in liquid phase at a controlled reaction temperature in excess of a certain minimum temperature. Although the minimum suitable temperature will depend in part upon the particular secondary alcohol that is being oxidized, and in part upon the other reaction conditions, in general temperatures below about 70° C. are insufficiently elevated either to provide a practical rate of production of hydrogen peroxide or to avoid excessive or even exclusive conversion of the molecular oxygen to other products than hydrogen peroxide. The most favorable results are obtained by operating at temperatures in excess of about 90° C. Temperatures up to about 140° C. may be employed advantageously, and temperatures even as high as 160° C. and more are operable. Where the temperature is materially above 160° C. and approaches temperatures at which the secondary alcohol cannot be held in the liquid phase by increasing the pressure, precautions with regard to safety come to be of increasing importance. Sudden release of the operating pressure, as by opening of a pressure-sensitive relief valve, may permit evaporation of the alcohol and concentration of the hydrogen peroxide content of the liquid product to a point where the liquid residue is liable to decompose violently or even detonate. In order to minimize the possibility that this sequence of events may occur, it is preferred to operate at a temperature not less than about 20° C. below the temperature of the critical point of the secondary alcohol reactant and even more preferably not less than about 50° C. therebelow. In general, in order to facilitate control of the reaction it is preferred to operate at temperatures not over about 225° C.

That temperatures within these elevated ranges are suited to a process for the production of hydrogen peroxide by oxidation of an alcohol in liquid phase was, indeed, a most surprising discovery. It was entirely unforeseen that a liquid mixture comprising predominantly organic materials and hydrogen peroxide could be maintained at these elevated temperatures, particularly over the periods of time that are illustrated in the examples presented hereinafter, without quantitative reduction or even explosive decomposition of the hydrogen peroxide either thermally or by reaction with the organic materials.

If the temperature that is to be employed is above the normal boiling point of the alcohol, superatmospheric pressures will be necessary in order to maintain the alcohol in liquid phase. The process in such cases is conducted in a closed reactor or system wherein the total pressure can be maintained by suitable means at or above the vapor pressure of the alcohol at the operating temperature. The pressure within the system may be maintained at the desired level by introducing the oxygen-containing gas under a suitable superatmospheric pressure and discharging the gaseous effluent through a regulated pressure let-down valve. Illustrative critical point data for secondary alcohols that can be employed in the process of the invention are as follows:

|  | °C. |
|---|---|
| Isopropyl alcohol—747 p. s. i. | 243 |
| sec-Butyl alcohol | 265 |
| sec-Octyl alcohol | 364 |
| 2-methyl-4-pentanol—680 p. s. i. | 312 |
| Cyclohexanol | 377 |

Where the secondary alcohol and ketone are relatively volatile it is convenient to operate at such a pressure that the body of liquid that is undergoing aeration is at or only slightly below boiling and to remove liberated heat by condensing either in whole or in part the volatilized alcohol, ketone, or alcohol and ketone and refluxing the condensate to the body of liquid in the reaction zone. Pressures greater than the minimum pressures necessary to keep the alcohol in liquid phase may be used. Provided the total pressure is sufficient to maintain secondary alcohol in the necessary liquid phase, the reaction rate and yield of hydrogen peroxide are relatively independent of the total pressure as such. The yield of hydrogen peroxide based upon the secondary alcohol consumed, however, is influenced by the partial pressure of molecular oxygen, as distinguished from the total pressure. The partial pressure of molecular oxygen in the feed gas may be varied over the range of from in the order of 0.5 pound per square inch (absolute) to in the order of 1000 pounds per square inch and more, while a preferred range is from about 15 pounds per square inch to about 250 pounds per square inch. The total pressure may be varied from about atmospheric pressure up to in the order of 10,000 pounds per square inch (absolute) or more. From the standpoint of the design and construction of equipment, the total pressure preferably will not exceed about 2000 pounds per square inch.

As the gas containing molecular oxygen there can be employed pure oxygen, or air, oxygen-enriched air, air diluted with nitrogen, or other gas mixtures containing molecular oxygen and a gaseous diluent that is chemically relatively stable under the operating conditions. Suitable diluents include, for example, nitrogen, methane, ethane, carbon dioxide, argon, helium, neon, and mixtures of the same.

It has been discovered in accordance with the invention that the oxidation of secondary alcohols in liquid phase to produce hydrogen peroxide is dependent upon the presence in the body of liquid undergoing oxidation, of certain materials which may be termed reaction initiators. When a highly purified secondary alcohol is subjected in liquid phase to treatment with an oxygen-containing gas under the reaction conditions and environment herein disclosed, there frequently will be an initial period of time during which there occurs no appreciable absorption of oxygen. The duration of this initial period may be as much as a few hours or even a number of days. At the end of this period, during which no evident reaction or absorption of oxygen occurs, reaction will commence gradually, leading to generation of hydrogen peroxide in the liquid upon its continued aeration with the oxygen-containing gas. Although it is not intended to limit the invention according to theory, it is believed that in such cases the commencement of the reaction that is productive of hydrogen peroxide is due to minute amounts of peroxides or other materials giving rise to free radicals, formed and ultimately accumulated in the body of the liquid. If during this initial period the liquid alcohol were in an environment in which these peroxidic materials could not be accumulated, for example, in the presence of substances which under the reaction conditions would cause their decomposition or would react with and destroy them, the accumulation of the necessary reaction initiators and consequently the formation of hydrogen peroxide would be prevented, even though the operating conditions were otherwise within the range of conditions suitable for the practice of the process of the invention. In the presence of ions of heavy metals, such as of cobalt, manganese, iron, copper, etc., which have been used by prior workers to catalyze oxidation of alcohols, or of undesirable impurities present in the alcohol itself, or even in reaction vessels, the interior surfaces of which adversely affect the stability of hydrogen peroxide, not only would the accumulation of the necessary peroxidic initiators and the formation of hydrogen peroxide be prevented, but the reaction of the alcohol with the oxygen would so proceed that water, rather than hydrogen peroxide, would be formed as inorganic product of the oxidation.

It has been further discovered in accordance with the invention that the reaction that is productive of hydrogen peroxide can be brought about by adding an initiator to the liquid alcohol and causing the alcohol and oxygen to react under the defined conditions and environment. By adding a small amount of hydrogen peroxide or other peroxidic reaction initiator to the liquid alcohol and treating the liquid alcohol with gas containing molecular oxygen under the defined conditions and environment in the presence of the added peroxidic compound, the desired reaction leading to formation of hydrogen peroxide can be caused to occur. Once the desired reaction has commenced, with formation of hydrogen peroxide, it is auto-initiating, or auto-catalytic. That is, the hydrogen peroxide produced by the reaction serves itself continually to initiate, to catalyze, or to maintain the reaction between the secondary alcohol and oxygen whereby further amounts of hydrogen peroxide are produced.

It ordinarily will be most convenient to add at the outset a small amount of hydrogen peroxide as the initiator. The added hydrogen peroxide may be commercial product, or it may be added in the form of the liquid product, containing hydrogen peroxide, produced by a prior oxidation conducted according to the invention and recycled and combined with the secondary alcohol that is to be subjected to oxidation. Other peroxidic compounds than hydrogen peroxide may be used, such as alkyl peroxides, organic peracids, persalts and peresters. Preferred organic peroxides which may be employed to initiate the reaction leading to formation of hydrogen peroxide are represented by tertiary-alkyl peroxides, that is, peroxides which have directly linked to the peroxy radical (—O—O—) a tertiary-alkyl radical, preferably the tertiary-butyl radical. Illustrative of these tertiary-alkyl peroxides are, for example, di-tertiarybutyl peroxide, tertiary-butyl, tertiary-amyl peroxide, tertiary-butyl hydroperoxide, 2,2-bis(tertiary-butylperoxy)propane, 2,2 - bis(tertiary-butylperoxy)butane, 1,1 - bis(tertiary - butylperoxy)cyclohexane and 2,2 - bis(tertiary-butylperoxy)pentane.

It has been observed that the amount of peroxide added to the secondary alcohol to initiate the reaction need be only minute. The amount of the peroxide added may be as little as 0.005% by weight of the alcohol. Amounts over about 3% by weight of the alcohol ordinarily will not be required, although such larger amounts can be used. The addition of as little as 1% by weight of hydrogen peroxide has been observed to be highly efficacious for initiating the desired reaction.

There advantageously may be included in the body of liquid that is undergoing oxidation a minor amount of one or more hydrogen peroxide stabilizers. As stabilizers there may be used, for example, such known organic hydrogen peroxide stabilizers as cyanides, alpha-hydroxyquinoline, acetanilide, benzoic acid, alpha-benzoyloxy-beta-dimethylaminobutyric acid, glycerine phenyl ether, thiourea, sodium salicylate, thymol, gum arabic, albumin, uric acid, guaiacol, phosphatides, acetylglycol, monoacetyl glycol ether, sodium benzene sulfonate, hexamethylenetetramine, and others, as well as such inorganic hydrogen peroxide stabilizers as oxy acids of phosphorus and their salts, such as trisodium orthophosphate, disodium monohydrogen orthophosphate, monosodium dihydrogen orthophosphate, orthophosphoric acid, sodium pyrophosphate, potassium pyrophosphate, potassium dihydrogen orthophosphate, sodium hypophosphate, sodium metaphosphate, pyrophosphoric acid and metaphosphoric acid; compounds of tin, antimony, silicon, or aluminum, such as sodium aluminate, sodium silicate, sodium metastannate, alpha-metastannic acid, hydrous antimony oxide, freshly precipitated alumina, freshly precipitated silica, silicic acid hydrosol, hydrous stannic oxide and tin-pyrophosphoric acid compounds. The hydrogen peroxide stabilizer may be added to the feed to the reaction vessel or introduced separately. It may be present in the liquid undergoing oxidation in concentrations up to 500 or more parts per million, a preferred range being from about 5 parts per million to about 300 parts per million.

In accordance with the invention, the rate of production of hydrogen peroxide can be accelerated and stability of the product enhanced by conducting the oxidation of the liquid alcohol under mildly acidic conditions. Traces of carboxylic acids may be formed during the oxidation of the alcohol. The reaction that is productive of hydrogen peroxide can be accelerated by allowing these acids to accumulate in the liquid that is undergoing oxidation. According to another embodiment, acid can be deliberately added to the liquid body in small regulated amounts in order to provide a desired degree of acidity. Acids which may be employed include, inter alia, such inorganic acids as sulfuric acid and the phosphoric acids, and such organic acids as acetic acid, oxalic acid, glutaric acid, p-toluene-sulfonic acid, benzenephosphonic acid, adipic acid, and the like. Acidic salts, such as potassium acid phosphate and sodium acid sulfate, and also buffer mixtures of a plurality of salts or of an acid and a salt, may be employed. Basic materials may be added where necessary or desirable in order to regulate the degree of acidity. The degree of acidity, which appears to influence both the rate of the chemical reaction or reactions that generate hydrogen peroxide and the stability of hydrogen peroxide, once formed, in the reaction system, may be varied from a neutral medium up to an acidity substantially equivalent to that of a 1% by weight solution of orthophosphoric acid in isopropyl alcohol-water constant boiling mixture. A preferred range of acidity is that equivalent to the acidity of a solution of from about 5 to about 100 parts per million of orthophosphoric acid in isopropyl alcohol-water constant boiling mixture.

In order to ensure an adequate rate of formation of hydrogen peroxide and, further, relative stability of hydrogen peroxide in the reaction system, the body of liquid that is undergoing aeration should be kept saturated, or substantially so, with oxygen at the operating conditions of temperature and partial pressure of oxygen in the gaseous stream. The body of liquid and the gas containing molecular oxygen may be brought into intimate contact with each other, as by atomizing the gas into the liquid, to facilitate passage of molecular oxygen from the gas phase into the liquid phase. The gas containing molecular oxygen should be introduced in sufficient quantity to provide in the reaction zone an excess of molecular oxygen over that being absorbed by the body of liquid at any given moment. The presence of sufficient oxygen can be ensured by maintaining such intimate gas-liquid contact and an appreciable partial pressure of oxygen in the gaseous effluent. Desirably, the oxygen partial pressure in the gaseous effluent will be not less than about 0.5 pound per square inch (absolute) and even more preferably not less than about 4 pounds per square inch (absolute).

In order to minimize surface effects which would adversely affect stability of hydrogen peroxide in the reaction system, it is desirable to employ as the reaction vessel one that has a relatively large ratio of volume to surface. The reaction vessel preferably has the form of a body of revolution and may be, for example, cylindrical, elliptical, pear-shaped, or spherical, at least with reference to that part that is in contact with the body of liquid alcohol reactant. The presence of substances which would cause decomposition of the hydrogen peroxide in the reaction system is to be avoided as far as is reasonably possible. The presence in the liquid of the various ions of heavy metals which are known to catalyze decomposition of hydrogen peroxide, is especially undesirable; for example, nickel, iron, cobalt, copper, manganese, vanadium, silver, chromium, and compounds thereof. The introduction in or with the secondary alcohol of impurities which would cause decomposition of the hydrogen peroxide should be scrupulously avoided.

The inner surface of the reaction vessel should be constructed of or lined with aluminum, an aluminum alloy, tin, a stainless steel or glass, enamel, porcelain or like predominantly silicious material, a resin or other material in contact with which hydrogen peroxide is relatively stable. The inner surface of the reactor, when composed of glass or like silicious material, may be treated with a suitable compound of boron, such as boric acid, or the inner surface may be an acidic enamel. In small-scale operations, involving, for example, treatment at one time of only a few gallons or less of the secondary alcohol, the reaction vessel desirably is one that has been conditioned, or passivated, as by repeated prior use in non-catalytic oxidation processes, by washing with nitric acid, or by repeated washing of the vessel with an aqueous solution of hydrogen peroxide. Where the reaction vessel is constructed of or lined with stainless steel, new equipment preferably is thoroughly cleaned and then passivated by treatment with a strong volatile oxidizing agent, preferably hot 15 to 50% w. nitric acid and hot 30 to 60% aqueous hydrogen peroxide in succession. Stainless steel vessels that have been used previously in the process and that have not been allowed to become grossly contaminated with impurities, can be passivated by soaking in contact with hot 30 to 60% aqueous hydrogen peroxide solutions alone.

The method of the invention may be carried out in either a batchwise, an intermittent, or a continuous manner. The process may be commenced by introducing a quantity of the secondary alcohol into the reactor, preferably with addition of a small amount of a peroxidic compound, such as hydrogen peroxide or recycled product from a prior oxidation, and passing a stream of the oxygen-containing gas into and through the liquid. As the aeration of the liquid is continued under the defined conditions, hydrogen peroxide is generated and the content thereof in the liquid progressively increases. In batchwise operations, the hydrogen peroxide can be recovered when its concentration in the liquid has reached the desired level. When the process is operated continuously, as is preferred, a portion of the liquid product containing hydrogen peroxide is withdrawn and additional amounts of the alcohol are added, at rates adapted to maintain a substantially constant volume of liquid in the reactor. The rates of introduction of alcohol and withdrawal of the contents of the reactor preferably are so adjusted that the concentration of hydrogen peroxide in the body of liquid in the reactor remains substantially constant, as may be determined in any convenient manner, such as by withdrawal of aliquots and suitable analysis thereof. The particular flow rate that will be required will depend upon the reaction temperature and to a lesser extent upon the other reaction conditions that are employed. The hydrogen peroxide content of the alcohol undergoing oxidation conveniently may be maintained within the range of from about ½% by weight to about 25% by weight. However, even higher concentrations of hydrogen peroxide may be attained, the maximum practical concentration being governed primarily by the requirement for safe operations in the particular reaction system that is employed.

The secondary alcohol feed to the process preferably is purified prior to its introduction into the reactor so as to remove any trace amounts of metallic impurities such as compounds of iron, copper, cobalt, etc. This may be done by contacting the feed with a suitable ion exchange resin, or by distilling. Where the feed is purified by distillation it may be condensed to the liquid state before it is introduced into the reactor, or part or all of the heat requirements in the reactor can be supplied by feeding vapors of the alcohol directly into the liquid that is undergoing oxidation, where they are condensed and liberate their latent heat. The alcohol feed may contain water, as where a constant boiling mixture of water and the secondary alcohol is employed, or it may be a substantially anhydrous feed. Inert organic solvents may be present in the feed, although the feed preferably is limited to the secondary alcohol as the organic component.

The successful practice of the process of the invention is not dependent upon the application to the reacting mixture of actinic energy, as in the form of actinic irradiations. In other words, the process is effective whether carried out in the presence of light or in the dark. It will be evident that this characteristic, taken with the virtually quantitative yields of hydrogen peroxide that may be obtained, serves to distinguish the process from reports in the prior art of instances in which stable organic peroxides have been observed to result from irradiation of alcohols at temperatures near or about ordinary room temperatures. Furthermore, the necessity for employing complex and expensive equipment required for irradiation is obviated.

The hydrogen peroxide ordinarily is obtained in the form of a solution comprising the hydrogen peroxide and unconsumed secondary alcohol reactant. The solution is in itself a useful product. For example, it may be used directly in processes for chemical syntheses, such as the hydroxylation of unsaturated organic compounds and the synthesis of inorganic persalts such as percarbonates and perborates. In such cases, the hydrogen peroxide value of the solution can be recovered without need for separation of hydrogen peroxide as such or as an aqueous solution from the crude reaction product.

The hydrogen peroxide may be separated from the solution produced by the oxidation of the alcohol by various methods. The organic products of oxidation may be removed from the solution by distillation. Water, if present, may be removed by distillation or by treatment with a dehydrating agent. Where the hydrogen peroxide is to be recovered by distillation, the liquid product preferably should be distilled in the presence of water in order to reduce the possible danger of explosion upon heating and concentrating hydrogen peroxide in the presence of organic materials. It is preferred to add sufficient water to maintain the concentration of hydrogen peroxide in the still kettle at all times below about 50%. The alcohol and organic materials produced by oxidation of the alcohol may be separated from each other simultaneously during the distillation, by successive distillations from the solution containing the hydrogen peroxide, or by subsequent distillation of a mixture. The aqueous solution of hydrogen peroxide recovered by the distillation of the alcohol and the organic oxidation products can if desired be further diluted with water and distilled according to methods known to those skilled in the art to further purify it and to obtain an aqueous solution of hydrogen peroxide having any desired concentration.

The invention is not limited to the recovery of the hydrogen peroxide from the liquid oxidation product by techniques of distillation. For example, the alcoholic solution containing the hydrogen peroxide may be treated with an alkali, such as calcium hydroxide, to precipitate the metal peroxide, from which if desired hydrogen peroxide may be regenerated. Where the alcohol is one in which hydrogen peroxide is only slightly soluble, the reaction mixture may stratify during the aeration treatment and the layer comprising predominantly hydrogen peroxide may be withdrawn separately. The hydrogen peroxide can also be recovered in suitable cases by extraction from the reaction mixture by treatment with selective solvents, or the organic materials can be removed by extraction with one or more solvents. The entire reaction mixture, or that part remaining after removal of carbonylic by-products, may be chilled to separate or precipitate solid hydrogen peroxide. A tertiary alcohol and a strong acid can be added to the reaction mixture to form a tertiary alkyl peroxidic compound.

The process of the invention can be operated advantageously in a cyclic manner. For example, the ketone produced in the process can be hydrogenated, with or without prior separation from the unconsumed alcohol, by treatment with molecular hydrogen in the presence of a hydrogenation catalyst, such as Raney nickel, copper chromite, or other known suitable catalyst, to reconvert it to the secondary alcohol. The secondary alcohol obtained by hydrogenation of the ketone, along with the unconsumed secondary alcohol, can be recycled through the process with addition of further alcohol as make-up.

The following examples illustrate certain of the many possible specific embodiments of the invention. It will be appreciated that the examples are presented with the intent to illustrate the invention rather than to limit the same as it is defined in the hereto-appended claims.

EXAMPLE I

The apparatus that was employed comprised a spherical flask fabricated of "Pyrex," or low-alkali-content borosilicate glass, having a capacity of about 500 cubic centimeters, surrounded by a heated oil bath. The flask was one that had been conditioned by prior repeated use over a period of several months as the reactor for non-catalytic oxidation of various organic compounds by treatment with molecular oxygen, and with which care had been taken to avoid contamination by substances which promote decomposition of peroxides, such as ions of heavy metals. The flask was equipped with an inlet tube opening near the bottom of the flask and serving for introduction of gaseous oxygen below the surface of liquid contained in the flask. The neck of the flask was sealed to the lower end of a vertically-positioned water-cooled reflux condenser. The upper end of the condenser was connected by glass tubing through a cold-trap, a reservoir of gaseous oxygen, and a gas-circulating pump, in series, to the inlet tube of the flask, forming a closed system through which oxygen-containing gas was circulated by the pump. The reservoir of gaseous oxygen was provided with an inlet through which measured volumes of water were introduced into the reservoir to replace the oxygen as it was consumed, providing a means of maintaining constant pressure in the system during the run and measuring the amount of oxygen consumed. The entire system, when in operation, was sealed from the atmosphere and was adapted to be operated under moderately superatmospheric pressures. The glass reactor was surrounded by a suitable shield to exclude all visible and ultra-violet light.

There were placed in the flask 300 cubic centimeters of redistilled isopropyl alcohol and 5 cubic centimeters of a 50% aqueous solution of hydrogen peroxide. The system was swept out with gaseous oxygen, then closed from the atmosphere. The oxygen pressure was increased to 35 pounds per square inch (gauge), and the temperature of the oil bath was raised to 105° C. to 110° C. By means of the pump the oxygen was bubbled through the isopropyl alcohol and continuously recycled, the rate of oxygen flow being sufficient to thoroughly agitate and to saturate the liquid with oxygen (in this case about 150 cubic centimeters per minute). The pressure was kept constant during the aeration by addition of water to the reservoir as the oxygen was consumed. In 29 hours at 100° C. to 105° C., 0.62 mole of oxygen was consumed. During the first 8 hours oxygen was taken up at an average rate of about 0.011 mole per hour and during the last 8 hours at an average rate of about 0.034 mole per hour. At the end of the reaction time the volume of the solution was about 270 cubic centimeters, about 40 cubic centimeters of liquid being found in the cold trap. The contents of the flask and the cold trap were combined and a small measured portion analyzed. On the basis of the analyses, it was determined that 0.555 mole of hydrogen peroxide and 0.575 mole of acetone had been produced. On the basis of the amount of isopropyl alcohol consumed this corresponded to a 93% yield of acetone and on the basis of the amount of oxygen consumed, to a 90% yield of hydrogen peroxide.

EXAMPLE II

Hydrogen peroxide was recovered from the remaining portion of the mixture produced in Example I by diluting the mixture with about one-half its volume of water saturated with sodium metastannate and acetanilide (as stabilizers for hydrogen peroxide) and distilling the diluted mixture under a pressure of about 20 millimeters of mercury. A mixture of acetone, isopropyl alcohol, and water was distilled overhead. The distillation was stopped when organic materials ceased to come over. About 140 cubic centimeters of solution remained in the still kettle. This remaining approximately 15% colorless solution of hydrogen peroxide in water contained 0.538 mole of hydrogen peroxide, representing an 87% yield of recovered hydrogen peroxide based on the amount of oxygen consumed and a 97% efficiency in the recovery treatment. On the basis of the amount of isopropyl alcohol consumed, the overall yield of recovered hydrogen peroxide was 87%.

EXAMPLE III

This example was carried out according to the procedure and in the apparatus described in Example I except that there was initially added to the isopropyl alcohol 5 cubic centimeters of glacial acetic acid in addition to the aqueous solution of hydrogen peroxide. Gaseous oxygen at 35 pounds per square inch was circulated through the isopropyl alcohol containing the added hydrogen peroxide and acetic acid at 105° C. to 110° C. for 13 hours. From analysis of the solution thus obtained it was determined that 0.231 mole of hydrogen peroxide had been produced. The amount of oxygen consumed in the experiment was 0.233 mole. The hydrogen peroxide thus was obtained in a yield of 99% based upon the amount of oxygen consumed. During the run the oxygen was consumed at an average rate of 0.018 mole per hour, which was approximately 63.5% higher than the average rate of oxygen consumption described in Example I.

EXAMPLE IV

This experiment was similar to the experiments described in Examples I and III except that the addition of hydrogen peroxide and acetic acid to the isopropyl alcohol was omitted. The reaction vessel was a new Pyrex flask of the type described in Example I, which had been thoroughly and repeatedly cleaned with a hot mixture of redistilled sulfuric and nitric acids and then exhaustively washed with distilled water. Three hundred cubic centimeters of redistilled isopropyl alcohol were placed in the reactor. The liquid isopropyl alcohol was aerated with gaseous oxygen under a pressure of 35 pounds per square inch flowing at a rate of about 150 cubic centimeters per minute, at 105° C. for 12.5 hours. At the end of this time, the flow of oxygen was discontinued. By analysis of an aliquot the solution was found to contain 0.415 mole of hydrogen peroxide. The amount of oxygen absorbed during the run was about 0.696 mole. The amount of hydrogen peroxide, determined by analysis, corresponded to a 60% yield based upon the amount of oxygen consumed.

EXAMPLE V

In this example, the apparatus used was the one described in Example I. To the flask were added 300 cubic centimeters of isopropyl alcohol and 5 polished strips of aluminum, each about 2″ x ½″ x .002″. A stream of gaseous oxygen under 35 pounds per square inch (gauge) pressure was circulated through the liquid mixture at a temperature of about 106° C. for 8 hours at a rate of about 150 cubic centimeters per minute. About 0.696 mole of oxygen was consumed. The resulting solution contained about 0.54 mole of hydrogen peroxide as determined by analysis. The yield of hydrogen peroxide was found to be 77% based upon the amount of oxygen consumed. The example thus shows that the process can be carried out in the presence of aluminum.

EXAMPLE VI

This example illustrates the preparation of hydrogen peroxide according to the method of the invention from secondary butyl alcohol. The apparatus described in Example IV was employed. Two hundred forty-four grams of pure secondary butyl alcohol were charged to the reactor and aerated at about 108° C. with oxygen under about 35 pounds pressure for 18 hours, in the manner described in Example I. There was consumed about 0.617 mole of oxygen. The resulting solution was analyzed and found to contain about 0.342 mole of hydrogen peroxide, which corresponded to a yield of 55.4% based upon the amount of oxygen consumed. In addition to hydrogen peroxide and unreacted secondary butyl alcohol, the solution was found by titration for carbonyl to contain 0.68 mole of carbonyl compounds (methyl ethyl ketone), corresponding to a yield of 110% of theory based upon the oxygen consumed. An aqueous solution of hydrogen peroxide was obtained by diluting the product with water and distilling secondary butyl alcohol and methyl ethyl ketone from the diluted product. The yield of recovered hydrogen peroxide was about 45% based on the amount of oxygen consumed.

EXAMPLE VII

This example, which was carried out according to the general procedure described in Examples I to VI illustrates the use in the process of a secondary alcohol having a branched-chain structure. To the reactor used in Examples IV to VI, there was added 300 cubic centimeters of purified methyl isobutyl carbinol (2-methyl-4-pentanol). The methyl isobutyl carbinol was aerated with a stream of gaseous oxygen under 35 pounds per square inch (gauge) pressure at 107° C. for 46 hours, the flow rate of the oxygen being about 150 cubic centimeters per minute. The resulting solution containing hydrogen peroxide dissolved in methyl isobutyl ketone and unreacted methyl isobutyl carbinol was analyzed and found to contain about 0.362 mole of hydrogen peroxide, corresponding to a 74% yield of hydrogen peroxide based on the amount of oxygen consumed.

EXAMPLE VIII 2,3-butanediol was oxidized according to the method used in Examples I to VII, by aeration for 8.5 hours with a stream of gaseous oxygen circulating at a rate of about 150 cubic centimeters per minute, at 35 pounds pressure and a temperature of 117° C. The resulting solution was found by analysis to contain 0.0435 mole of hydrogen peroxide.

EXAMPLE IX

Highly purified cyclohexanol in liquid state was treated with gaseous oxygen in the apparatus employed in Example IV. The reaction temperature was 103° C., the oxygen pressure 35 pounds per square inch (gauge) and the rate of flow of the oxygen about 150 cubic centimeters per minute. The duration of the oxidation was 21 hours. The amount of oxygen consumed was 0.505 mole. The resulting mixture was found by analysis to contain about 0.117 mole of hydrogen peroxide dissolved in a mixture of cyclohexanol and cyclohexanone. The mixture contained negligible amounts of acidic materials, corresponding to less than a 3% conversion of the cyclohexanol to acid compounds, any acid being calculated as adipic acid.

EXAMPLE X

The apparatus employed in the preceding examples was modified by opening the exit from the cold trap to the atmosphere through a pressure let-down valve and opening the intake line on the pump to the atmosphere through a suitable filter for removal of dust, etc. Redistilled isopropyl alcohol (300 cubic centimeters) was placed in the flask and was aerated with a stream of air under 35 pounds per square inch pressure, at 107° C. for 47 hours. The resulting mixture of acetone and isopropyl alcohol contained by analysis about 0.178 mole of hydrogen peroxide. The solution was diluted with water, and acetone and an azeotropic mixture of isopropyl alcohol and water were distilled off leaving the hydrogen peroxide in the form of a clear dilute solution in water. This solution was concentrated by distillation to obtain an approximately 30% by weight aqueous solution of hydrogen peroxide.

EXAMPLE XI

This experiment was carried out in order to demonstrate the suitability of a tin-lined reaction vessel. The reaction vessel comprised a vertical steel shell, 2″ I. D. and 5′ long, equipped with an external jacket through which hot oil could be circulated and, inside the jacket, with coils through which steam or cold oil or water could be circulated to help in adjusting and controlling the temperature. The lower end of the shell was closed. A liner in the form of a tube closed at the bottom and open at the top, and fabricated of tin-plated steel, was fitted tightly into the shell. The upper-end of the shell was closed by means of an aluminum flange assembly backed by carbon steel to provide sufficient mechanical strength. The upper closure was provided with suitable ports and fittings to which there were connected a gas inlet tube constructed of glass and terminating in a fritted glass gas disperser near the bottom of the tin-plated liner, a glass dip-tube for charging and emptying the reaction vessel, and a glass-clad thermocouple assembly. The upper flanges were provided with a gas outlet which led to a reflux condenser constructed of 2S aluminum and cooled with Dry-Ice-methanol, and arranged for return of condensate to the reactor by gravity flow. All fittings and tubing with which the feeds and reflux would come into contact were fabricated either of glass, 2S aluminum, or type 18—8 stainless steel, and the equipment was handled so as to avoid contamination during assembly and was thoroughly cleaned before use. The reflux condenser was connected in turn to a pressure let-down valve, through which effluent permanent gases were discharged to a wet test meter, a Hays oxygen analyzer and then vented.

The reactor was charged with about 2250 cubic centimeters of redistilled anhydrous isopropyl alcohol containing 39 parts per million of $H_3PO_4$ and, as initiator, about 250 cubic centimeters of crude product of a prior oxidation of isopropyl alcohol, containing about 5% w. hydrogen peroxide. Gaseous oxygen at about 115 pounds per square inch gauge was passed through the liquid contained in the reactor for about 3 hours at about 125° C., and the product then was withdrawn. The yield of hydrogen peroxide was found by analsyis to be 97% based upon the amount of acetone formed. The hydrogen peroxide content of the product was 11.1% by weight. The hydrogen peroxide was recovered in the form of an about 20% aqueous solution by diluting the product with water and distilling an aqueous mixture of acetone and unconsumed isopropyl alcohol from the diluted product.

EXAMPLE XII

This experiment was conducted in the equipment described in Example XI, except that the tin-plated liner was replaced by one constructed of Pyrex glass. There was charged to the reactor 2500 cubic centimeters of redistilled isopropyl alcohol containing 25% by weight of distilled water, 1% by weight of 2,2-di-tertiary-butylperoxybutane, 10 parts per million $H_3PO_4$, 20 parts per million $Na_4P_2O_7 \cdot 10H_2O$ and 30 parts per million 8-hydroxyquinoline. The mixture was aerated with gaseous oxygen under 115 pounds per square inch gauge for 4¼ hours at 130° C. The product contained 12.0% by weight of hydrogen peroxide, produced in a yield of 88% based upon the amount of oxygen consumed. Dilution of the product with water and distillation yielded an aqueous approximately 20% by weight solution of hydrogen peroxide.

EXAMPLE XIII

The experiments described in this example were carried out in the glass-lined reactor described in Examples XI and XII. The reactor was charged for each experiment with anhydrous alcohol containing about 2% by weight of added hydrogen peroxide as initiator, and the amounts of hydrogen peroxide stabilizer and water shown in the following table, and the mixture was aerated with gaseous oxygen at about 115 pounds per square inch gauge and a nominal temperature of 125–130° C. The results shown in the table were obtained.

| Run No. | $H_2O$ in feed, percent weight | Reaction temperature, °C. | Stabilizer | Concentration of stabilizer in feed, p. p. m. | $H_2O_2$ concentration in product | Yield of $H_2O_2$ on acetone formed |
|---|---|---|---|---|---|---|
| 1 | 12 | 125 | $Na_4P_2O_7 \cdot 10 H_2O$ | 10 | 9 | 98 |
| 2 | 25 | 135 | Sodium stannate | 50 | 9 | 88 |
| 3 | a 40 | 125 | {8-hydroxyquinoline / $Na_4P_2O_7 \cdot 10 H_2O$} | {30 / 20} | } 12.8 | 88 |
| 4 | 0 | 125 | $H_3PO_4$ | 35 | 16.2 | 85 | a The distilled water used in preceding runs was found to have contained about 0.01 part per million copper. For this run the isopropy alcohol and distilled water were purified by contact with Dowex 50 ion exchange resin before making up the reactor charge.

EXAMPLE XIV

This example illustrates operation under various conditions of controlled acidity. The experiments were carried out utilizing the glass-lined reactor described in Examples XI and XII. A constant-boiling mixture of isopropyl alcohol and water (ca. 12% w. $H_2O$) containing 1% by weight of added hydrogen peroxide as initiator was employed as feed. To the feed there were added the salts or acids shown in the following table. The oxidations were carried out at about 125° C. and 115 pounds per square inch gauge using gaseous oxygen as the oxidizing agent. The results shown in the table were obtained.

| Run No. | Additives identity | Amount, p. p. m. | $H_2O_2$ concentration in product at 6 hours' reaction time | $H_2O_2$ yield based on acetone produced |
|---|---|---|---|---|
| 1 | $Na_4P_2O_7 \cdot 10 H_2O$ | 5 | 4.0 | 86 |
| 2 | {$H_3PO_4$ / $Na_4P_2O_7 \cdot 10 H_2O$} | {60 / 5} | } 5.7 | 95 |
| 3 | $H_2SO_4$ | 10 | 8.3 | 91 |
| 4 | {$H_2SO_4$ / $CH_3COOH$} | {20 / 1,000} | } 9.0 | 81 |
| 5 | p-Toluene sulfonic acid | 60 | a 7.3 | a 94 | a At 3½ hours' reaction time.

EXAMPLE XV

In this example there is illustrated one mode of carrying out the process of the invention in a continuous manner. The reaction vessel, which was constructed of type 316 stainless steel, was 4" I. D. and 5' long and designed for operation at pressures up to 2000 p. s. i. g. The reactor was surrounded by an external jacket for circulation of hot oil, with coils located inside the jacket for circulation of steam or cold oil or water for supplement temperature control. An inlet fitted with a sparger for atomizing the gas feed passed through the lower end of the reactor. An inlet port near the top and an outlet port near the bottom of the reactor permitted continuous introduction and withdrawal of liquid feed and product, respectively. A port opening through the top of the reactor was connected to a stainless steel reflux condenser positioned above the reactor; in operation condensate flowed from the condenser back to the reactor while permanent gases were discharged in succession through a pressure let-down valve, wet test meter, Hays oxygen meter, and then vented. All fittings and connecting lines were fabricated of stainless steel.

After assembly, all surfaces to come into contact with the reaction mixture were thoroughly cleaned by washing with trichloroethylene and distilled water. In other experiments, utilizing similar new equipment, the surfaces were further cleaned by soaking in contact successively with a hot 10% aqueous solution of C. P. sodium hydroxide and hot 30% C. P. nitric acid, followed by rinsing with water and a 1% solution of $K_4P_2O_7$ in distilled water. In still other cases the surfaces were passivated by soaking in contact with 50% w. aqueous hydrogen peroxide solutions containing 200 parts per million of alkali metal pyrophosphate at about 100° C. for several hours.

The individual experiments were started by charging the reactor with the secondary alcohol containing 1 to 2% W. of added $H_2O_2$ as initiator and the inhibitor, if one was used, and pressuring the system to the selected operating pressure. The temperature then was raised to the selected level and flow of oxygen-containing gas was started. When the concentration of hydrogen peroxide in the reactor had built up to the desired level, continuous introduction of feed and withdrawal of product were commenced. Typical feeds, operating conditions, and results are shown in the following tables:

*Table A.—Feed compositions*

| Run No. | Gas | Isopropyl alcohol, percent weight | Water, percent weight | Additives | |
|---|---|---|---|---|---|
| | | | | Identity | Amount, p. p. m. |
| 1 | Air | 88 | 12 | $K_4P_2O_7$ | 15 |
| 2 | Air | 88 | 12 | $Na_4P_2O_7 \cdot 10H_2O$ | 20 |
| 3 | Air | 88 | 12 | None | |
| 4 | Air | 88 | 12 | $K_4P_2O_7$ | 15 |
| 5 | Air | 88 | 12 | $K_4P_2O_7$ | 15 |

*Table B.—Operating conditions and results*

| Run No. | Temperature, °C. | Pressure, p. s. i. g. | LHSV [a] | Acetone yield,[b] percent | $H_2O_2$ yield,[c] percent | Steady state $H_2O_2$ concentration, percent weight |
|---|---|---|---|---|---|---|
| 1 | 137 | 500 | 0.40 | 99 | 100 | 1.7 |
| 2 | 125 | 500 | 0.16 | 98 | 83.7 | 9.2 |
| 3 | 130 | 500 | 0.33 | 98 | 86.7 | 6.6 |
| 4 | 150 | 500 | 0.82 | 98 | 82.6 | 8.4 |
| 5 | 174 | 500 | 3.0 | (d) | (d) | 6.9 |

[a] Liquid hourly space velocity = volumes of feed per volume of reactor per hour.
[b] Based upon amount of alcohol consumed.
[c] Based upon acetone produced.
[d] Run carried out in the glass-lined reactor described in Examples XI and XII. Yields not determined because of equipment limitations which permitted escape of acetone and isopropyl alcohol in the vent gases.

EXAMPLE XVI

For this example there was employed a cylindrical reactor fabricated of type 316 stainless steel, 4" I. D. and 18" long. The reactor was fitted with a gas inlet tube terminating near the bottom of the reactor in a gas sparger, dip tubes for charging the reactor and withdrawing product, and internally located thermocouples, and was surrounded by a jacket through which hot oil could be circulated. A gas outlet led from the top of the reactor to a stainless steel reflux condenser positioned above the reactor and thence in succession to a pressure let-down valve, a Hays oxygen-meter, and vent to the atmosphere. The system was provided with the customary bursting disc assembly and, as a safeguard in case the disc should rupture and allow evaporation of organics from the liquid reaction mixture, means for rapidly flooding the reactor with isopropyl alcohol upon rupture of the disc. Prior to use, all parts of the system which would come into contact with the reaction mixture and reflux were passivated by washing with hot 30% C. P. nitric acid and then with hot 50% C. P. aqueous hydrogen peroxide.

The individual experiments were carried out by charging the reactor with about 1500 cubic centimeters of redistilled isopropyl alcohol-water constant boiling mixture containing about 15 parts per million of $K_4P_2O_7$, increasing the temperature and pressure to the desired level under a nitrogen atmosphere, and then aerating the charge with a mixture of nitrogen and air (about 8 to 10% v. $O_2$ in the mixture) at a rate sufficient to maintain at least 2% v. of oxygen, based upon the permanent gases, in the gaseous effluent. The conditions and results shown in the following table further describe these experiments.

| Run No. | Reaction temperature, °C. | Reaction pressure, p. s. i. g. | Concentration of hydrogen peroxide [a] | Rate of production of hydrogen peroxide [b] | Yield of hydrogen peroxide [c] |
|---|---|---|---|---|---|
| 1 | 180 | 750 | 2.9 | 185 | 59 |
| 2 | 190 | 750 | 2.2 | 161 | 62 |
| 3 | 205 | 750 | 2.8 | 214 | 24 |
| 4 | 205 | 1,000 | 2.0 | 210 | 30 |

[a] Weight percent in reaction mixture.
[b] Grams of $H_2O_2$ produced per hour per liter of reaction mixture at the listed concentration.
[c] Percent, based on acetone formed (mole basis).

Forming a part of the present specifications and serving more fully to explain and illustrate the process of the invention, there are exemplified in the accompanying drawing two specific methods of carrying out the process of the invention. Both of the figures of the accompanying drawing are drawn to no scale. In both figures, various accessory equipment, such as heating means, control and measuring devices, and in some cases pumps, valves, etc., all of which may be necessary but which can be supplied where required by those skilled in the art, have been omitted.

Turning firstly to Figure 1, there is shown in section apparatus suitable for a batchwise execution of the process. The apparatus comprises five principal parts. These are oxygen reservoir 1, pump 22, reaction vessel 7, condenser 14, and cold trap 19, all interconnected as shown.

Oxygen reservoir 1 may be a pressure-resistant tank of convenient design equipped with valved inlet 2, valved vent 3, valved drain connection 4 and connection 5 provided with valve 6.

The reaction vessel 7 is shown to be a glass flask, positioned in heated bath 8 of mineral oil or other suitable heat-exchange liquid 9. The flask is equipped with valved connection 10 for charging and removing liquid, and with gas inlet 11 which may terminate in gas dispersing means 12, such as a perforate plate. The flask is connected via connector 13 to water-cooled condenser 14, cooling water being circulated through the jacket of the condenser via inlet 15 and outlet 16. From the top of the condenser connections 17 and 18 lead to cold trap 19 and with connections 20 and 21, pump 22 and valved connection 23 form a closed system for circulation of oxygen-containing gas. The cold-trap is chilled with Dry-Ice 23 held in Dewar flask 24.

The entire system may be constructed of glass, and must be scrupulously clean so as to avoid introduction of deleterious contaminants into the secondary alcohol which is undergoing oxidation. At least those parts of the equipment which come into contact with the liquid alcohol desirably are exhaustively cleaned, as by treatment with a hot mixture of redistilled sulfuric and nitric acids followed by exhaustive washing with distilled water so as to ensure the removal of any traces of contaminants adhering to or adsorbed on the surfaces.

In carrying out the process of the invention using the equipment illustrated in Figure 1, reservoir 1 first is filled with the oxygen-containing gas at substantially the pressure to be used in the oxidation. Reactor 7 is filled to a convenient level with the secondary alcohol introduced through valved connection 10. A small amount of hydrogen peroxide or other peroxide preferably is added with the alcohol as reaction initiator. The system then is swept out with oxygen-containing gas introduced through connection 5 and vented at valved vent 25.

With vents 3 and 25, drain connection 4, and connection 10 closed and valves 16 and 6 open, water is introduced at the desired operating pressure through inlet 2, the reaction vessel is brought to the desired operating temperature, and circulation of the gas by pump 22 is commenced. Alcohol which volatilizes is condensed in condenser 14 and runs back into the oxidation mixture; similarly, volatile products of the oxidation are condensed and returned to the mixture. Any condensable materials which pass through the condenser are trapped in a cold-trap 19. Oxygen-containing gas consumed in the process is replaced by water introduced under the desired operating pressure into reservoir 1 by inlet 2. The hydrogen peroxide produce by the oxidation accumulates in the liquid contained in reaction vessel 7 and, depending inter alia upon the duration fo the run, may be present at a concentration of 10% by weight or more.

At termination of the oxidation, the liquid oxidation product is withdrawn from reaction vessel 7 via connection 10. The hydrogen peroxide is recovered by diluting the mixture with water and then distilling or by other suitable method.

Turning to Figure 2, there is illustrated partly in elevation and partly in section, apparatus suitable for larger-scale, continuous, and cyclic operation of the process of the invention. The apparatus comprises reaction vessel 101, fractionating columns 114 and 118, and hydrogenator 122.

Reaction vessel 101 is provided with valved feed line 102 for liquid feed, valved feed line 103 for introduction of oxygen-containing gas, with liquid effluent line 104 and with gaseous effluent line 105.

Condenser 106 is provided for condensing volatilized materials from the gaseous effluent, the condensate being continuously returned to the reaction vessel via line 107, separator 108, line 109 and inlet 110. Connecting line 111 serves (with pumps, not shown) for recycle of the gaseous effluent. Alternatively, valved vent 112 permits venting of the gaseous effluent in whole or in part. Oxygen-containing gas is supplied to the system at the desired operating pressure at inlet 113.

Column 114, which is connected to reaction vessel 101 through lines 104 and 115, is a fractionating column of any conventional type designed for effecting separation of the secondary alcohol and the corresponding ketone overhead from an aqueous solution of hydrogen peroxide withdrawn as bottoms product at outlet 116. For example, when hydrogen peroxide is being produced by oxidation of isopropyl alcohol, column 114 is one designed to take acetone and isopropyl alcohol-$H_2O$ constant boiling mixture overhead from an aqueous solution of hydrogen peroxide. Inlet 117 is provided for adding water to the liquid oxidation product prior to the distillation in column 114. Column 118, to which overhead fraction is conveyed from column 114 via line 119, is a fractionating column of any conventional type designed for separation of the secondary alcohol and the corresponding ketone. Line 120 connects column 118 through condenser 121 to hydrogenator 122, which contains a hydrogenating catalyst. Lines 123, 124, 125, pump 126 and line 127 connect column 118 and hydrogenator 122 to inlet 110 for purposes of recycle.

Reaction vessel 101 should be constructed of or lined with aluminum, porcelain, a stainless steel, glass, tin or other material which is compatible with hydrogen peroxide. Column 114 should be constructed of materials known to be suitable for distillation of hydrogen peroxide, such as chemical stoneware, porcelain, or aluminum. Prior to use the reaction vessel desirably is carefully washed with pure concentrated nitric acid. All necessary precautions should be taken to ensure freedom from contaminants at least in that part of the system which comes into contact with the oxidation mixture.

In conducing the process in the equipment shown in Figure 2, reaction vessel 101 is first filled with the secondary alcohol and a peroxidic reaction initiator preferably is added. Aeration is commenced at the operating temperature with oxygen-containing gas introduced through line 113 and valved inlet 103. As the aeration is continued hydrogen peroxide is formed and accumulates in the liquid contents of the reaction vessel. Effluent gas may be recycled in whole or in part through line 105, condenser 106, line 107, separator 108 and line 111 and condensed volatilized materials may be returned from the separator to the reaction vessel via lines 109 and 110. When the hydrogen peroxide has accumulated in reactor 101 to the desired level of concentration, additional amounts of the alcohol are continuously introduced into reaction vessel 101 via inlet 102 at a rate such that a substantially constant concentration of hydrogen peroxide is maintained in the liquid contents of the reaction vessel.

Liquid oxidation product is continuously withdrawn via line 104, diluted with water introduced via inlet 117, and the diluted product is fractionally distilled in column 114. An aqueous solution of hydrogen peroxide containing, say, 15% to 20% by weight of hydrogen peroxide is withdrawn as bottoms product from column 114 via line 116. This solution may be further concentrated by known distillatory methods.

A mixture of secondary alcohol and corresponding ketone, e. g., isopropyl alcohol-water azeotrope and acetone, is taken as overhead product from column 114 via line 119 to column 118, wherein the mixture is fractionated. The ketone, taken overhead from column 118 to hydrogenator 122, is hydrogenated in the gaseous state or (as shown) in the liquid state by reaction with hydrogen introduced at inlet 122a. The secondary alcohol formed by the hydrogenation is recycled via lines 123 and 124, pump 126, and lines 127 and 110 to the reactor along with the unconsumed alcohol recovered as bottoms product from column 118 via line 124.

I claim as my invention:

1. In a process for the preparation of hydrogen peroxide from a secondary alcohol in liquid phase, the steps of reacting said alcohol with oxygen non-photochemically in a liquid phase containing only secondary alcohol as progenitor of hydrogen peroxide, in the presence of hydrogen peroxide at a reaction temperature upwards from about 70° C. in a reaction environment in which hydrogen peroxide is relatively stable, introducing oxygen-containing gas and further amounts of said secondary alcohol into the liquid body comprising said secondary alcohol and said hydrogen peroxide at rates so as to hold the temperature of said liquid body substantially constant during the major part of the contact period, withdrawing liquid product from the reaction system at a rate adjusted to maintain the volume of said liquid body substantially constant, and recovering hydrogen peroxide from said liquid product.

2. In a process for the preparation of hydrogen peroxide from isopropyl alcohol in liquid phase, the steps of reacting isopropyl alcohol with oxygen non-photochemically in a liquid phase containing only isopropyl alcohol as progenitor of hydrogen peroxide, in the presence of hydrogen peroxide at a reaction temperature upwards from about 70° C. in a reaction environment in which hydrogen peroxide is relatively stable, introducing an oxygen-containing gas and further amounts of isopropyl alcohol into the liquid body comprising said isopropyl alcohol and said hydrogen peroxide at rates so as to hold the concentration of hydrogen peroxide in the liquid body substantially constant during the major portion of the contact period, withdrawing liquid product from the reaction system, and recovering hydrogen peroxide from said liquid product.

3. A process for the manufacture of hydrogen peroxide from a secondary alcohol in liquid phase, which process comprises reacting a secondary alcohol with molecular oxygen-containing gas introduced into a body of liquid comprising in liquid state only secondary alcohol as progenitor of hydrogen peroxide, and hydrogen peroxide, at a temperature upwards from about 70° C. and at a total pressure not less than the vapor pressure of the body of liquid at the operating temperature, accumulating peroxidic products of the oxidation in said body of liquid and continuing the introduction of molecular oxygen-containing gas into said body of liquid in the continued presence of accumulated peroxidic products of the oxidation at least until hydrogen peroxide is formed in said body of liquid, the body of liquid being maintained in an environment in which hydrogen peroxide is relatively stable, the foregoing operations being conducted non-photochemically, and thereafter recovering hydrogen peroxide from the liquid oxidation product.

4. A process for the manufacture of hydrogen peroxide which comprises reacting a secondary alcohol non-photochemically with molecular oxygen-containing gas introduced into a body of liquid comprising a major amount and as sole progenitor of hydrogen peroxide a secondary alcohol in liquid state, and in minor amount hydrogen peroxide, at a temperature within the range of from about 70° C. to about 160° C. and a total pressure not less than the vapor pressure of the body of liquid at the operating temperature, and continuously introducing molecular oxygen-containing gas into said body of liquid comprising said secondary alcohol and said hydrogen peroxide in the absence of photochemical irradiation at least until hydrogen peroxide is formed therein while maintaining said body of liquid devoid of and out of contact with substances which promote decomposition of the hydrogen peroxide therein.

5. The process for the manufacture of hydrogen peroxide which comprises passing a stream of molecular oxygen-containing gas into and through a body of liquid containing in major amount a lower secondary alcohol in liquid state as sole progenitor of hydrogen peroxide and in lesser amounts ketone corresponding in structure to the secondary alcohol, hydrogen peroxide, and water at a temperature within the range of from about 70° C. to about 160° C. and at a total pressure within the range of from the vapor pressure of the body of liquid at the operating temperature up to about 2000 pounds per square inch, continuing the passage of the stream of molecular oxygen-containing gas into and through said body of liquid in the continued presence of accumulated products of the oxidation at least until hydrogen peroxide is generated in the body of liquid, while maintaining the body of liquid devoid of substances which promote decomposition of the hydrogen peroxide therein, the foregoing operations being conducted non-photochemically, and thereafter fractionally distilling the liquid oxidation product containing said alcohol, ketone, water, and hydrogen peroxide to separate therefrom an aqueous solution of hydrogen peroxide.

6. The continuous process for the manufacture of hydrogen peroxide which comprises continuously aerating with molecular oxygen-containing gas in the absence of photochemical irradiation a body of liquid comprising in major amount a secondary alcohol in liquid state as sole progenitor of hydrogen peroxide and, in lesser amounts, the ketone corresponding in structure to the secondary alcohol and hydrogen peroxide at a temperature upwards from about 70° C. at a total pressure not less than the vapor pressure of the body of liquid at the operating temperature, the body of liquid being maintained in a confined reaction zone in which hydrogen peroxide is relatively stable, continuously adding an additional amount of the secondary alcohol to the body of liquid undergoing aeration, continuously withdrawing a liquid portion of the body of liquid undergoing aeration and containing secondary alcohol, said ketone, and hydrogen peroxide, and adjusting the rate of input of lower secondary alcohol to the body of liquid undergoing aeration and the rate of withdrawal of said liquid portion so as to maintain the body of liquid that is undergoing aeration at a substantially constant volume and further so as to maintain a substantially constant and substantial concentration of hydrogen peroxide therein.

7. The continuous process for the manufacture of hydrogen peroxide which comprises continuously aerating with molecular oxygen-containing gas in the absence of photochemical irradiation a body of liquid comprising in major amount a lower secondary alcohol in liquid state as sole progenitor of hydrogen peroxide, from about ½% to about 25% by weight of hydrogen peroxide, the ketone corresponding in structure to the lower secondary alcohol in an amount substantially stoichiometrically equivalent to the hydrogen peroxide, and water at a temperature within the range of from about 70° C. to about 160° C. and at a total pressure within the range of from the vapor pressure of the body of liquid at the operating temperature up to about 2000 pounds per square inch, the body of liquid being maintained in a confined reaction zone in which hydrogen peroxide is relatively stable, continuously adding an additional amount of the lower secondary alcohol to the body of the liquid undergoing aeration, continuously withdrawing a liquid portion of the body of liquid undergoing aeration and containing lower secondary alcohol, said ketone, and hydrogen peroxide, and adjusting the rate of input of lower secondary alcohol to the body of liquid and the rate of withdrawal of said liquid portion of the body of liquid so as to maintain the body of liquid that is undergoing aeration at a substantially constant volume and further so as to maintain a substantially constant and substantial concentration of hydrogen peroxide therein.

8. The process for the manufacture of hydrogen peroxide which comprises adding from about 0.005% to about 3% by weight of a peroxide to a body of liquid comprising as the only progenitor of hydrogen peroxide secondary alcohol in liquid state, aerating the liquid body containing the added peroxide with a stream of molecular oxygen-containing gas in the absence of photochemical irradiation at a temperature within the range of from about 70° C. to about 160° C. at a total pressure not less than the vapor pressure of the liquid body at the operating temperature at least until hydrogen peroxide is formed and accumulates in the body of liquid, and recovering hydrogen peroxide from the liquid oxidation product.

9. The process defined by claim 8 in which the added peroxide is a tertiary-alkyl peroxide.

10. The process defined by claim 9 in which the added tertiary-alkyl peroxide is a tertiary butyl peroxide.

11. The process defined by claim 8 in which the added peroxide is hydrogen peroxide.

12. The process for the manufacture of hydrogen peroxide which comprises passing a stream of molecular oxygen-containing gas in the absence of photochemical irradiation into and through a body of liquid comprising in major amount a secondary alcohol as sole progenitor of hydrogen peroxide and, in lesser amounts, the ketone corresponding in structure to the secondary alcohol, hydrogen peroxide, and added non-reducing aliphatic carboxylic acid at a temperature upwards from about 70° C. and at a pressure not less than the vapor pressure of the body of liquid at the operating temperature at least until hydrogen peroxide is formed and accumulates in the body of liquid, the body of liquid being devoid of substances which promote decomposition of the hydrogen peroxide therein, and recovering hydrogen peroxide from the liquid oxidation product.

13. The process defined by claim 12 in which the added acid is acetic acid.

14. The continuous process for the manufacture of hydrogen peroxide which comprises in combination the steps: maintaining a mass of liquid comprising in major amount a lower secondary alcohol as sole progenitor of hydrogen peroxide, lesser amounts of ketone corresponding in structure to the alcohol and between about ½% and about 25% by weight of hydrogen peroxide under continuous aeration with a molecular oxygen-containing gas in the absence of photochemical irradiation continually in the presence of peroxidic products of the oxidation of the lower secondary alcohol at a temperature within the range of from about 70° C. to about 160° C. and a total pressure not less than the vapor pressure of the body of liquid at the operating temperature, withdrawing from the mass of liquid undergoing aeration a liquid portion thereof and distilling said liquid portion in the presence of water to separate therefrom on the one hand unconsumed alcohol and said ketone, and on the other hand an aqueous solution of hydrogen peroxide, hydrogenating the ketone by treatment with gaseous hydrogen in the presence of a hydrogenation catalyst under hydrogenation conditions to reconvert the ketone to the said secondary alcohol, recycling the unconsumed secondary alcohol contained in said withdrawn portion and secondary alcohol produced by the hydrogenation of the ketone to the aeration step of the process, adding a further amount of the secondary alcohol to the system as make-up, and controlling the rate of withdrawal of said liquid portion and the rates of introduction of the secondary alcohol so as to maintain the mass of secondary alcohol undergoing aeration at a substantially constant volume and further so as to maintain a substantially constant and substantial concentration of hydrogen peroxide therein.

15. The process for the production of hydrogen peroxide which comprises passing a stream of molecular oxygen-containing gas into and through a body of liquid comprising in major amount isopropyl alcohol in liquid state as sole progenitor of hydrogen peroxide and in minor amount hydrogen peroxide in a confined reaction zone in which hydrogen peroxide is relatively stable and at a temperature upwards from about 70° C. at a total pressure not less than the vapor pressure of the body of liquid at the operating temperature and continuing the passage of said stream of molecular oxygen-containing gas into and through said body of liquid continually in the presence of accumulated peroxidic products of the oxidation whereby hydrogen peroxide is formed and accumulates in the body of liquid, the foregoing operations being conducted non-photochemically, and recovering hydrogen peroxide from the body of liquid.

16. The process for the manufacture of hydrogen peroxide which comprises passing a stream of molecular oxygen-containing gas into a body of liquid comprising in major amount isopropyl alcohol in liquid state as sole progenitor of hydrogen peroxide and in lesser amount acetone, hydrogen peroxide and water at a temperature within the range of from about 70° C. to about 160° C. and a total pressure within the range of from the vapor pressure of the body of liquid at the operating temperature up to about 2000 pounds per square inch, continuing the passage of the stream of molecular oxygen-containing gas into said body of liquid in the presence of hydrogen peroxide at least until hydrogen peroxide is generated in the body of liquid, while maintaining the body of liquid in an environment in which the hydrogen peroxide therein is relatively stable, the foregoing operations being conducted non-photochemically, and thereafter fractionally distilling the liquid oxidation product containing acetone, hydrogen peroxide, water, and unconsumed isopropyl alcohol to separate therefrom an aqueous solution of hydrogen peroxide.

17. The process for the manufacture of hydrogen peroxide which comprises adding from about ½% to about 3% by weight of a peroxide to isopropyl alcohol in liquid state as sole progenitor of hydrogen peroxide, passing a stream of molecular oxygen-containing gas in the absence of photochemical irradiation into and through the liquid isopropyl alcohol containing the added peroxide at a temperature within the range of from about 70° C. to about 160° C. at a total pressure not less than the vapor pressure of the body of liquid at the operating temperature, continuing the passage of the stream of molecular oxygen-containing gas in the absence of photochemical irradiation into and through said liquid isopropyl alcohol containing said added hydrogen peroxide at least until hydrogen peroxide is formed and accumulates in the body of liquid, and thereafter recovering hydrogen peroxide from the liquid oxidation product.

18. The process defined by claim 17 in which the added peroxide is a tertiary-alkyl peroxide.

19. The process defined by claim 17 in which the added peroxide is hydrogen peroxide.

20. The process defined by claim 17 in which the isopropyl alcohol is employed in the form of an azeotropic mixture of isopropyl alcohol and water.

21. The continuous process for the manufacture of hydrogen peroxide which comprises continuously aerating with molecular oxygen-containing gas a body of liquid essentially comprising in major amount isopropyl alcohol in liquid state as sole progenitor of hydrogen peroxide and in minor amounts acetone, and hydrogen peroxide at a temperature within the range of from about 70° C. to about 160° C. and at a total pressure not less than the vapor pressure of the body of liquid at the operating temperature, the body of liquid being maintained in a confined reaction zone in which the hydrogen peroxide is relatively stable and in the absence of photochemical irradiation, continuously adding isopropyl alcohol to the body of liquid undergoing aeration, continuously withdrawing a liquid portion of the body of liquid undergoing aeration and containing isopropyl alcohol, acetone, and hydrogen peroxide, and adjusting the rate of input of isopropyl alcohol to the body of liquid undergoing aeration and the rate of withdrawal of said liquid portion so as to maintain the body of liquid at a substantially constant volume and further so as to maintain a substantially constant and substantial concentration of hydrogen peroxide therein.

22. The continuous process for the manufacture of hydrogen peroxide which comprises continuously aerating with molecular oxygen-containing gas a body of liquid consisting essentially of isopropyl alcohol as sole progenitor of hydrogen peroxide containing in solution from about ½% to about 25% of hydrogen peroxide, based upon the weight of the solution, acetone in an amount substantially stoichiometrically equivalent to the hydrogen peroxide, and water at a temperature within the range of from about 70° C. to about 160° C. and at a total pressure not less than the vapor pressure of the solution at the operating temperature, the body of liquid being maintained in a confined reaction zone wherein the hydrogen peroxide therein is relatively stable and in the absence of photochemical irradiation, continuously adding isopropyl alcohol to the body of liquid undergoing aeration, continuously withdrawing a liquid portion of the body of liquid undergoing aeration and containing isopropyl alcohol, acetone, and hydrogen peroxide, and adjusting the rate of input of isopropyl alcohol to the body of liquid undergoing aeration and the rate of withdrawal of said liquid portion so as to maintain the body of liquid undergoing aeration at a substantially constant volume and further so as to maintain a substantially constant concentration of hydrogen peroxide therein.

23. The continuous process for the manufacture of hydrogn peroxide which comprises continuously aerating with molecular oxygen-containing gas a body of liquid essentially comprising in major amount secondary butyl alcohol as sole progenitor of hydrogen peroxide and in lesser amounts methyl ethyl ketone, accumulated organic peroxidic products of oxidation of the secondary butyl alcohol, and hydrogen peroxide at a temperature within the range of from about 70° C. to about 160° C. and a total pressure not less than the vapor pressure of the body of liquid at the operating temperature, the body of liquid being maintained in a confined reaction zone wherein the hydrogen peroxide therein is relatively stable and in the absence of photochemical irradiation, continuously adding secondary butyl alcohol to the body of liquid undergoing aeration, continuously withdrawing a liquid portion of the body of liquid undergoing aeration and containing secondary butyl alcohol, methyl ethyl ketone, and hydrogen peroxide, and adjusting the rate of input of secondary butyl alcohol and the rate of withdrawal of said liquid portion so as to maintain the body of liquid at a substantially constant volume and further so as to maintain substantially constant and substantial concentrations of said accumulated organic peroxidic products and of hydrogen peroxide therein.

24. The process for the manufacture of hydrogen peroxide which comprises adding a peroxide to a body of liquid comprising a secondary alcohol in liquid state as sole progenitor of hydrogen peroxide, passing a stream of molecular oxygen-containing gas into the liquid body containing the added peroxide at a temperature upwards from about 70° C. at a total pressure not less than the vapor pressure of the liquid body at the operating temperature and continuing the passage of the stream of molecular oxygen-containing gas into the liquid body at least until hydrogen peroxide is formed and accumulates in the liquid body, while maintaining the liquid body in an environment in which hydrogen peroxide therein is relatively stable and in the absence of photochemical irradiation, and recovering hydrogen peroxide from the liquid oxidation product.

25. A process for the production of hydrogen peroxide which comprises passing a stream of molecular oxygen-containing gas in the absence of photochemical irradiation into and through a body of liquid essentially comprising a secondary alcohol in liquid state as sole progenitor of hydrogen peroxide at a temperature of from about 70° C. to about 160° C. at a total pressure not less than the vapor pressure of the body of liquid at the operating temperature, while maintaining the said body of liquid throughout substantially at saturation with the molecular oxygen-containing gas and scrupulously out of contact with and devoid of substances which promote decomposition of hydrogen peroxide therein, accumulating peroxidic products of oxidation of the secondary alcohol in the said body of liquid which is undergoing aeration, continuing the aeration of the said body of liquid in the absence of photochemical irradiation continuously in the presence of accumulated peroxidic products of the oxidation at least until an appreciable and substantial concentration of hydrogen peroxide has been produced and accumulated in the said body of liquid, and recovering hydrogen peroxide from the liquid product.

26. A process for the production of hydrogen peroxide which comprises passing a stream of molecular oxygen-containing gas in the absence of photochemical irradiation into and through a body of liquid essentially comprising isopropyl alcohol in liquid state as sole progenitor of hydrogen peroxide at a temperature of from about 70° C. to about 160° C. at a total pressure not less than the vapor pressure of the body of liquid at the operating temperature, while maintaining the body of liquid throughout substantially at saturation with the molecular oxygen-containing gas and scrupulously out of contact with and devoid of substances which promote decomposition of hydrogen peroxide therein, accumulating peroxidic products of oxidation of the isopropyl alcohol in the said body of liquid which is undergoing aeration, continuing the aeration of the said body of liquid in the absence of photochemical irradiation continuously in the presence of accumulated peroxidic products of the oxidation at least until an appreciable and substantial concentration of hydrogen peroxide has been produced and accumulated in the said body of liquid adding isopropyl alcohol to the said body of liquid which is undergoing aeration, withdrawing a liquid portion of the said body of liquid which is undergoing aeration and containing unconsumed isopropyl alcohol and hydrogen peroxide, the rate of addition of isopropyl alcohol and withdrawal of the said liquid portion being regulated to maintain a concentration of hydrogen peroxide in the said body of liquid within the range of from about ½% to about 25% by weight, and recovering hydrogen peroxide from the withdrawn liquid portion.

27. A process for the production of hydrogen peroxide which comprises passing a stream of molecular oxygen-containing gas in the absence of photochemical irradiation into and through a body of liquid essentially comprising secondary butyl alcohol in liquid state as sole progenitor of hydrogen peroxide at a temperature of from about 70° C. to about 160° C. at a total pressure not less than the vapor pressure of the body of liquid at the operating temperature, while maintaining the body of liquid throughout substantially at saturation with the molecular oxygen-containing gas and scrupulously out of contact with and devoid of substances which promote decomposition of hydrogen peroxide therein, accumulating peroxidic products of oxidation of the secondary butyl alcohol in the said body of liquid which is undergoing aeration, continuing the aeration of the body of liquid in the absence of photochemical irradiation continuously in the presence of accumulated peroxidic products of the oxidation at least until an appreciable and substantial concentration of hydrogen peroxide has been produced and accumulated in the body of liquid, and recovering hydrogen peroxide from the liquid product.

28. A process for the production of hydrogen peroxide which comprises passing a stream of molecular oxygen-containing gas in the absence of photochemical irradiation into and through a body of liquid essentially comprising isopropyl alcohol in liquid state as sole progenitor of hydrogen peroxide at a temperature of from about 70° C. to about 160° C. at a total pressure not less than the vapor pressure of the body of liquid at the operating temperature, while maintaining the body of liquid throughout substantially at saturation with the molecular oxygen-containing gas and scrupulously out of contact with and devoid of substances which promote decomposition of hydrogen peroxide therein, accumulating peroxidic products of oxidation of the isopropyl alcohol in the said body of liquid which is undergoing aeration, continuing the aeration of the body of liquid in the absence of photochemical irradiation continuously in the presence of accumulated peroxidic products of the oxidation at least until an appreciable and substantial concentration of hydrogen peroxide has been produced and accumulated in the body of liquid, and recovering hydrogen peroxide from the liquid product.

29. A process for the manufacture of hydrogen peroxide from a water-miscible secondary alcohol in liquid phase, which process comprises reacting a water-miscible secondary alcohol non-photochemically with molecular oxygen-containing gas introduced into a body of liquid comprising said water-miscible secondary alcohol in liquid state as sole progenitor of hydrogen peroxide, and hydrogen peroxide, at a temperature upwards from about 70° C. and at a total pressure not less than the vapor pressure of the body of liquid at the operating temperature, accumulating peroxidic products of the oxidation in said body of liquid and continuing the introduction of molecular oxygen-containing gas into said body of liquid in the absence of photochemical irradiation and in the presence of accumulated peroxidic products of the oxidation at least until hydrogen peroxide is formed and accumulates in said body of liquid, the body of liquid being maintained in an environment in which hydrogen peroxide is relatively stable, and recovering hydrogen peroxide from the liquid oxidation product.

References Cited in the file of this patent

UNITED STATES PATENTS

| | | |
|---|---|---|
| 2,115,206 | Milas | Apr. 26, 1938 |
| 2,144,341 | Michalek | Jan. 17, 1939 |
| 2,158,525 | Riedl et al. | May 16, 1939 |
| 2,430,865 | Farkas et al. | Nov. 18, 1947 |
| 2,479,111 | Harris | Aug. 16, 1949 |

FOREIGN PATENTS

| | | |
|---|---|---|
| 294,265 | Great Britain | Oct. 18, 1928 |

OTHER REFERENCES

Walton et al.: "Journal of the American Chemical Society," volume 54, pages 3228–3229 (August 1932).

Richter: "Textbook of Organic Chemistry," 1938, pages 96–97.

Hildebrand: "Principles of Chemistry," 5th ed. (combined volume), page 171, published by the MacMillan Co., N. Y., N. Y., 1947.

Slater et al.: "The Anthraquinone Autoxidation Process for the Production of Hydrogen Peroxide," P. B. 4336, pages 5–7, 10 and 14, March 29, 1946.